March 21, 1944.  R. R. LONGWELL ET AL  2,344,828

CONTROL SYSTEM

Filed Oct. 28, 1942

WITNESSES:
James F. Young
Joe Weber

INVENTORS
Robert R. Longwell and
Tracy C. Wetherby.
BY
ATTORNEY

Patented Mar. 21, 1944

2,344,828

UNITED STATES PATENT OFFICE 2,344,828

CONTROL SYSTEM

Robert R. Longwell and Tracy C. Wetherby, Forest Hills, Pa., assignors to Westinghouse Electric & Manufacturing Company, East Pittsburgh, Pa., a corporation of Pennsylvania Application October 28, 1942, Serial No. 463,614

17 Claims. (Cl. 172—274)

The present invention relates, generally, to control systems, and, more particularly, to control systems for starting and varying the speed of variable speed induction motors.

It is common practice to vary the speed of a wound rotor induction motor by varying the loading of its rotor circuit. This variable loading is commonly supplied by an alternating-current machine which is mechanically connected in driving relation with a direct-current machine, which, in turn, is electrically connected to another direct-current machine, the second direct-current machine being connected in driving relation with an alternating-current machine which is connected to a power source.

An object of the invention is to provide a control system for induction motors which shall function to start and control the speed of variable speed induction motors and which shall properly coordinate the starting, speed control, and stopping control elements of the system.

Figure 1:
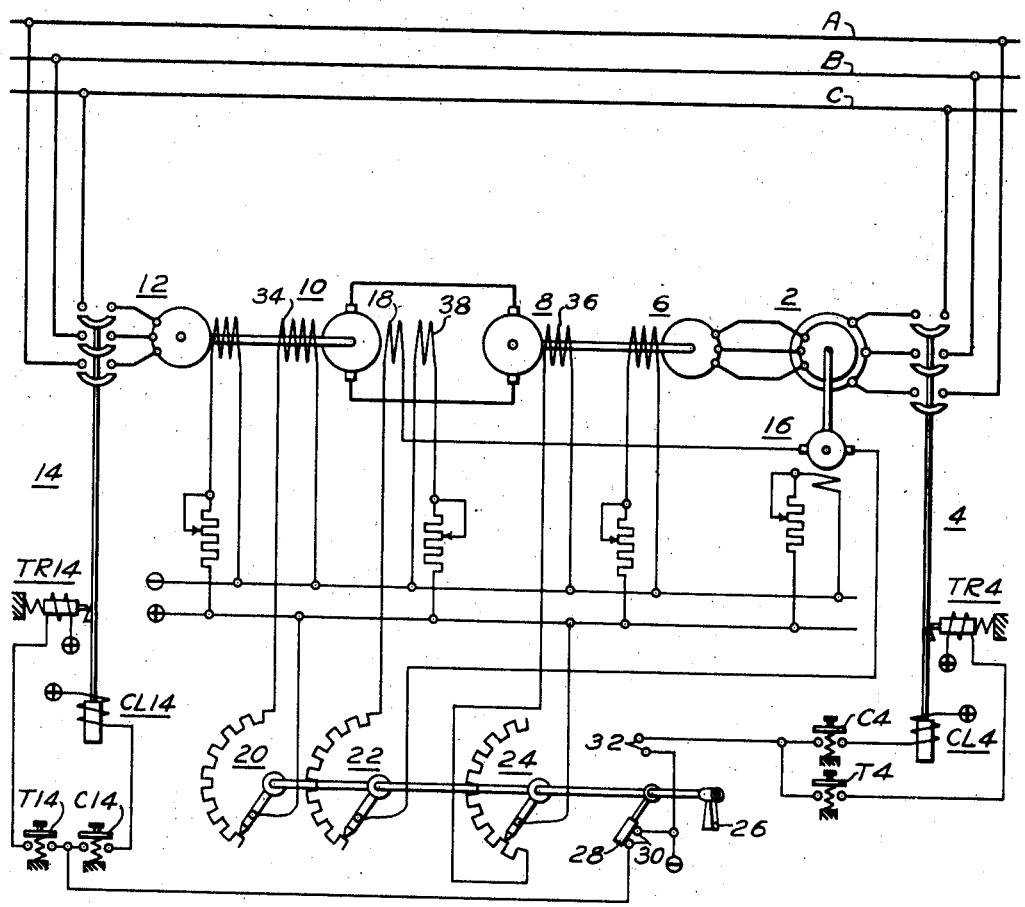
Figure 2:
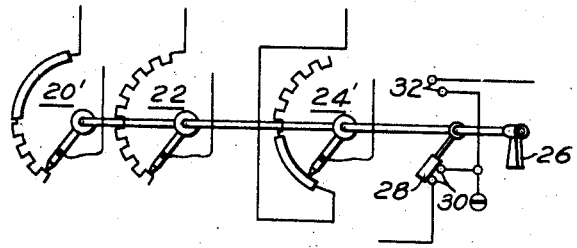

These and other objects and advantages of the invention will be apparent from the following detailed description taken in connection with the accompanying drawing in which:

Figure 1 is a diagrammatic representation of an induction motor control system embodying the principal features of the invention; and Fig. 2 is an illustration of a modification of the system shown in Fig. 1.

In practicing the invention, a wound rotor induction motor 2 is disposed to have one of its windings, either rotor or stator, connected by a circuit breaker 4 to a source of alternating-current power indicated by the conductors A—B—C. The other winding of the motor 2 is connected to an alternating-current machine 6 which may operate either as a synchronous motor or an alternating-current generator and the machine 6 is mechanically connected in driving relation with the direct-current dynamo-electric machine 8, which may be operated as a direct-current motor or a direct-current generator. A second dynamo-electric machine 10 which may be operated either as a direct-current generator or a direct-current motor has its armature connected in circuit with the armature of the machine 8 and is mechanically connected in driving relation with an alternating-current machine 12 which may be operated as a synchronous motor or an alternating-current generator. A circuit breaker 14 is disposed to connect the alternating-current windings of the machine 12 to the source of alternating-current power A—B—C.

A pilot generator 16 is driven by the induction motor 2 and energizes the circuit of an auxiliary motor 7 and energizes the circuit of an auxiliary field winding 18 of the dynamo-electric machine 10 in accordance with the speed of the induction motor 2. Variable resistors 20, 22 and 24 are connected in the circuits of the field windings of the dynamo-electric machines 10 and 8, as indicated, and are disposed to be simultaneously operated by a control member 26. A contact element 28 operated by the control member 26 controls interlock circuits for opening and closing devices for the circuit breakers 4 and 14.

Considering the invention more in detail, the closing coil CL14 for the circuit breaker 14 is connected to be energized in a circuit which includes a manually operable circuit control device C14 and the interlock contact element 28 in cooperation with fixed contact elements 30. A tripping device TR14 for the circuit breaker 14 also depends for its operation upon the engagement of the contact elements 28 and 30 in circuit with a manually operable circuit control device T14. In a similar manner, the closing coil CL4 and the tripping device TR4 of the circuit breaker 4 depend for their operation upon the engagement of the interlock contact element 28 with fixed contact elements 32, and the manual operation of circuit control devices C4 and T4.

The variable resistor 20 operable by the control element 26 is connected in circuit with the main field winding 34 of the dynamo-electric machine 10 to increase the excitation of the machine 10 as its movable contact element is actuated from the position shown in the drawing toward the other extreme position. The variable resistor 24 is connected in circuit with the field winding 36 of the dynamo-electric machine 8 to decrease the excitation of the machine 8 simultaneously with the increase of the excitation of the machine 10. The variable resistor 22 is disposed to decrease the effective resistance of the energizing circuit for the field winding 18 as the energization of the field winding 34 of the motor 10 is increased. An auxiliary field winding 38 is associated with the dynamo-electric machine 10 and is continuously energized with such current as will produce an excitation of the machine 10 sufficient to counteract the residual magnetism of the fields of the machine 10 so that the machine 10 will have zero minimum excitation when its main field winding 34 has a minimum energization.

In the operation of this system, when it is desired to start the induction motor 2 with the circuit breakers 4 and 14 open, the control element 26 may be moved in the counterclockwise direction to the position shown in the drawing and the contact element C14 may be actuated to close the circuit breaker 14. After the motor 12 has attained full speed under energization from the conductors A—B—C, the control member 26 may be moved in a clockwise direction to increase the excitation of the machine 10 and decrease the excitation of the machine 8. Under these conditions of operation, the machine 10 will operate as a direct-current generator and the machine 8 will operate as a direct-current motor, the increase of the output potential of the machine 10 will cause increased energization of the armature of the machine 8, the decreased energization of the field winding 36 of the machine 8 will decrease the excitation of the machine 8 and the machine 8 will accelerate to, in turn, accelerate the alternating-current machine 6. The acceleration of the alternating-current machine 6, which is now acting as an alternator, will cause its output frequency to increase and the variable resistors 20 and 24 are so calibrated as to cause the frequency of the machine 6 to be substantially equal to the frequency of the alternating-current source of power A—B—C when the control 26 has been moved to the position in which the interlock contact elements 28 and 32 are engaged.

With the frequency acting on the rotor winding of the induction motor 2 substantially equal to that of the source of power A—B—C, the circuit breaker 4 may now be closed by actuation of the manually controlled contact element C4 to energize the stator winding of the induction motor 2. The circuit breaker 4 will preferably be closed as hereinbefore described only after synchronism between the potential on the rotor winding of the motor 2 and the potential of the source of power A—B—C has been established. With the rotor and stator windings of the induction motor 2 thus energized at the same frequency, the motor will act as an unloaded transformer and will remain at standstill.

When it is desired to accelerate the motor 2 the control member 26 may be moved in the counterclockwise direction to decrease the excitation of the machine 10 and increase the excitation of the machine 8. This change in the excitations of the machines 8 and 10 will cause the machine 8 to be driven as a generator by the machine 6 which will now act as a synchronous motor and the machine 8 will actuate the machine 10 as a direct-current motor which will feed power to the conductors A—B—C through the machine 12 acting as a generator. The greater the increase of the excitation of the machine 8 and the decrease of the excitation of the machine 10, the lower the speed of the machine 6 will become and the more the speed of the induction motor 2 will increase. Thus the speed of the induction motor 2 may be varied between zero speed and maximum speed by the proper manipulation of the control member 26.

The pilot generator 16 acts as a regulator to compensate for any variations of the speed of the motor 2 from the speed corresponding to the setting of the control member 26, and the variable resistor 22 is so calibrated as to cause the pilot generator 16 to produce substantially the same energization of the field winding 18 regardless of the speed of the pilot generator 16. If, however, the speed of the motor 2, and, therefore, the pilot generator 16 should vary from that for which the control member 26 is set, there will be a change in the excitation of the motor 10 by the field winding 18 which will so change the total excitation of the machine 10 as to, in turn, change the speed of the induction motor 2 to compensate for the variation of the speed of induction motor 2.

When it is desired to stop and deenergize the motor 2, it will be necessary to move the control member 26 to the position in which the interlock contact elements 28 and 32 are engaged, in which position the motor 2 will be stopped and the manually operable circuit control device T4 may be actuated to open the circuit breaker 4. In order to deenergize the machine 12, it will be necessary to actuate the control member 26 in the counterclockwise direction to engage the interlock contact elements 28 and 30, thus decreasing the excitation of the machine 10 to zero, deenergizing the armature of the motor 8, and permitting the energization of the tripping device TR14 of the circuit breaker 14 by the actuation of the manually operable circuit control device T14.

In the modification of the system shown in Fig. 2, the elements may be substituted for elements bearing similar reference characters in Fig. 1. In this embodiment of the invention the excitations of the machines 8 and 10 are varied separately by the operating member 26 and not simultaneously as they are in the system of Fig. 1. When the operating member 26 is rotated in the clockwise direction, the excitation of the machine 10 will be increased from substantially zero to maximum during the first part of the travel of the movable contact element of the variable resistor 20'. Meanwhile, the excitation of the machine 8 will remain at a maximum since the effective resistance of the variable resistor 24' is not affected during the first part of the travel of its movable contact element. During the remaining portion of the travel of the control member 26 the effective resistance of the variable resistor 24' will be decreased to decrease the excitation of the machine 8 while the excitation of the machine 10 remains at a maximum.

Thus it will be seen that we have provided a control system for induction motors which shall function to start and control the speed of variable speed induction motors and which shall properly coordinate the speed control and stopping control elements of the system.

In compliance with the requirements of the patent statutes, we have shown and described herein a preferred embodiment of our invention. It is to be understood, however, that the invention is not limited to the precise construction shown and described, but is capable of modification by one skilled in the art, the embodiment shown herein being merely illustrative of the principles of our invention.

We claim as our invention:

1. In a control system for a wound rotor induction motor, an alternating-current machine connected to one of the reacting windings of the motor, means for energizing the other reacting windings of the motor with alternating-current power, means for controlling the speed of the alternating-current machine, and means for preventing the operation of the energizing means when the speed controlling means is in any position other than that in which the frequency of the alternating-current machine is substantially the same as that of the alternating-current power with which the other winding is to be energized.

2. In a control system for a wound rotor induction motor, a circuit control device for connecting one of the reacting windings of the induction motor to a source of alternating-current power, an alternating-current machine connected to the other reacting winding of the motor, control means for varying the speed of the alternating-current machine, and means for preventing closure of the circuit control device when the speed varying means is in any position other than that in which the frequency of the said potential acting on the said other winding is substantially the same as that of the alternating-current power with which the one winding is to be connected.

3. In a control system for an induction motor having rotor and stator windings, a circuit control device for connecting one set of the windings of the induction motor to a source of alternating-current power, means for applying an auxiliary alternating-current potential to the other set of windings, control means for varying the frequency of the auxiliary alternating-current potential, a circuit control device actuable to closed circuit position by said control means only when the control means is in the position to provide an auxiliary potential of substantially the same frequency as that of the alternating-current power.

4. In a control system for an induction motor having primary and secondary windings, a circuit control device for connecting one set of the windings of the induction motor to a source of alternating-current power, means for actuating said circuit control device to closed circuit position, means for actuating said circuit control device to open circuit position, means for applying an auxiliary alternating-current potential to the other set of windings, control means for varying the frequency of the auxiliary alternating-current potential, and means for preventing actuation of the circuit control device to either closed or open position when the frequency control means is in any position other than that which corresponds to an auxiliary potential frequency substantially equal to the frequency of the source of power.

5. In a control system for an induction motor having primary and secondary windings, means for energizing one of the windings from a source of alternating-current power, an alternating-current machine connected to the other winding, a dynamo-electric machine connected in driving relation with the alternating-current machine, and means responsive to the speed of the induction motor for controlling the speed of the dynamo-electric machine.

6. In a control system for an induction motor having primary and secondary windings, a circuit control device for connecting one of the windings to a source of alternating-current power, an alternating-current generator connected to energize the other winding, a variable speed motor for driving the alternating-current generator, control means for varying the speed of the variable speed motor, and means for preventing closure of said circuit control device when said control means is adjusted for any speed of the variable speed motor other than the speed that produces a frequency of the alternating-current generator potential substantially equal to the frequency of the source of power.

7. In a control system for an induction motor having primary and secondary windings, a circuit control device for connecting one of the windings to a source of alternating-current power, an alternating-current generator connected to energize the other winding, a variable speed motor for driving the alternating-current generator, selective control means for varying the speed of the variable speed motor, means responsive to the speed of the induction motor for controlling the speed of the variable speed motor, and means for preventing closure of the circuit control device when said control means is adjusted for any speed of the variable speed motor other than the speed that produces an alternating-current generator frequency substantially equal to the frequency of the source of power.

8. In a control system for an induction motor having primary and secondary windings, means for energizing one winding of the induction motor from a source of alternating current power, an alternating-current machine connected to the other winding of the induction motor, a dynamo-electric machine connected in driving relation with the alternating-current machine, control means for varying the energization of the dynamo electric machine, and means for preventing energization and deenergization of the dynamo-electric machine when the control means is in any position other than that corresponding to substantially the minimum frequency of the alternating-current machine.

9. In a control system for an induction motor having primary and secondary windings, a source of alternating-current power, means for connecting and disconnecting one of the windings to and from the source of alternating-current power, an alternating-current machine connected to the other winding of the motor, a dynamo-electric machine connected in driving relation with the alternating-current machine, control means for varying the energization of the dynamo-electric machine, means controlled by said control means for preventing energization or deenergization of the dynamo-electric machine when the control means is in any position other than that corresponding to a substantially minimum speed of the dynamo-electric machine, and means controlled by said control means for preventing the operation of the said connecting and disconnecting means when the control means is in any position other than that corresponding to an alternating-current machine frequency substantially equal to the frequency of the source of alternating-current power.

10. In a control system for an induction motor having reacting primary and secondary windings, a first circuit control device for connecting one of the windings to a source of alternating-current power, an alternator for energizing the other winding, motor means for driving the alternator, a second circuit control device for energizing the motor drive means, control means for varying the frequency of the alternator, means controlled by said control means for preventing operation of said first circuit control device when the control means is in any position other than that corresponding to an alternator frequency substantially equal to the frequency of the source of alternating-current power, and means controlled by the control means for preventing the operation of said second circuit control device when the control means is in any position other than that corresponding to substantially the minimum frequency of the alternator.

11. In a control system for an induction motor having reacting primary and secondary windings, a first circuit control device for connecting one of the windings to a source of alternating-current power, an alternating-current machine connected to the other of the windings, dynamo-electric means connected in driving relation with the alternating-current machine, a second circuit control device for energizing the dynamo-electric means, means responsive to the speed of the induction motor for varying the speed of the alternating-current machine, control means for simultaneously selectively varying the speed of the alternating-current machine and the calibration of the speed responsive means, means controlled by said control means for preventing operation of said first circuit control device when the control means is in any position other than that corresponding to an alternating-current machine frequency substantially equal to the frequency of the source of alternating-current power, and means controlled by the control means for preventing the operation of said second circuit control device when the control means is in any position other than that corresponding to the minimum frequency of the alternating-current machine.

12. In a control system for an induction motor having primary and secondary reacting windings, means for energizing one of the windings from a source of alternating-current power, an alternating-current machine connected to the other winding, a first dynamo-electric machine connected in driving relation with the alternating-current machine, a second dynamo-electric machine electrically connected with the first dynamo-electric machine, and control means for simultaneously varying the excitation of the dynamo-electric machines.

13. In a control system for an induction motor having primary and secondary reacting windings, means for energizing one of the windings from an alternating-current source of power, an alternating-current machine connected to the other winding, a first direct-current dynamo-electric machine connected in driving relation with the alternating-current machine, a second direct-current dynamo-electric machine electrically connected to the first direct-current dynamo-electric machine, means responsive to the speed of the induction motor for varying the excitation of the second dynamo-electric machine, and control means for simultaneously varying the excitations of the first and second direct-current dynamo-electric machines and the calibration of the speed responsive means.

14. In a control system for an induction motor having primary and secondary reacting windings, means for energizing one of the windings from a source of alternating-current power, an alternating-current machine connected to the other windings, a first dynamo-electric machine connected in driving relation with the alternating-current machine, a second dynamo-electric machine electrically connected to the first dynamo-electric machine, a pilot generator driven by the induction motor and connected to vary the excitation of one of the dynamo-electric machines, a resistor connected in the excitation circuit of each of the dynamo-electric machines, a resistor connected in the circuit of the pilot generator, and control means for simultaneously varying the effective resistance values of the said resistors.

15. In a control system for an induction motor having primary and secondary reacting windings, a first circuit control device for connecting and disconnecting one of the windings to and from an alternating-current source of power, a first alternating-current machine connected to the other windings, a first dynamo-electric machine connected in driving relation with the alternating-current machine, a second dynamo-electric machine electrically connected to said first dynamo-electric machine, a second alternating-current machine connected in driving relation with the second dynamo-electric machine, a second circuit control device for energizing and deenergizing the second alternating-current machine, control means for simultaneously varying the excitations of the dynamo-electric machines, means responsive to the control means for preventing the operation of the first circuit control device when the control means is in any position other than the position corresponding to a first alternating-current machine frequency substantially equal to the frequency of the alternating-current source of power, and means controlled by the control means for preventing the operation of the second circuit control device when the control means is in any position other than the position corresponding to a minimum frequency of the first alternating-current machine.

16. In a control system for an induction motor having primary and secondary reacting windings, a first circuit control device for connecting and disconnecting one of the windings to and from an alternating-current source of power, a first alternating-current machine connected to the other windings, a first dynamo-electric machine connected in driving relation with the alternating-current machine, a second dynamo-electric machine electrically connected to said first dynamo-electric machine, a second alternating-current machine connected in driving relation with the second dynamo-electric machine, a second circuit control device for energizing and deenergizing the second alternating-current machine, means responsive to the speed of the induction motor for varying the excitation of one of the dynamo-electric machines, control means for simultaneously varying the excitation of the dynamo-electric machines and the calibration of the speed responsive means, means responsive to the control means for preventing the operation of the first circuit control device when the control means is in any position other than the position corresponding to a first alternating-current machine frequency substantially equal to the frequency of the alternating-current source of power, and means controlled by the control means for preventing the operation of the second circuit control device when the control means is in any position other than the position corresponding to a minimum frequency of the first alternating-current machine.

17. In a control system for an induction motor having primary and secondary reacting windings, means for energizing one of the windings from a source of alternating-current power, an alternating-current machine connected to the other winding, a first dynamo-electric machine connected in driving relation with the alternating-current machine, a second dynamo-electric machine electrically connected to the first dynamo-electric machine, means responsive to the speed of the induction motor for varying the excitation of one of the dynamo-electric machines, means for varying the excitation of the first dynamo-electric machine, means for varying the excitation of the second dynamo-electric machine, means for varying the calibration of the speed responsive means, and a movable control means for actuating the excitation varying means for one of the dynamo-electric machines during a portion of its travel, the excitation varying means for the other of the dynamo-electric machines during the remainder of its travel, and the calibration varying means during its entire travel.

ROBERT R. LONGWELL.
TRACY C. WETHERBY.